(No Model.)
W. GLEASON.
BELT SHIFTER FOR IRON PLANERS.
No. 301,054. Patented June 24, 1884.
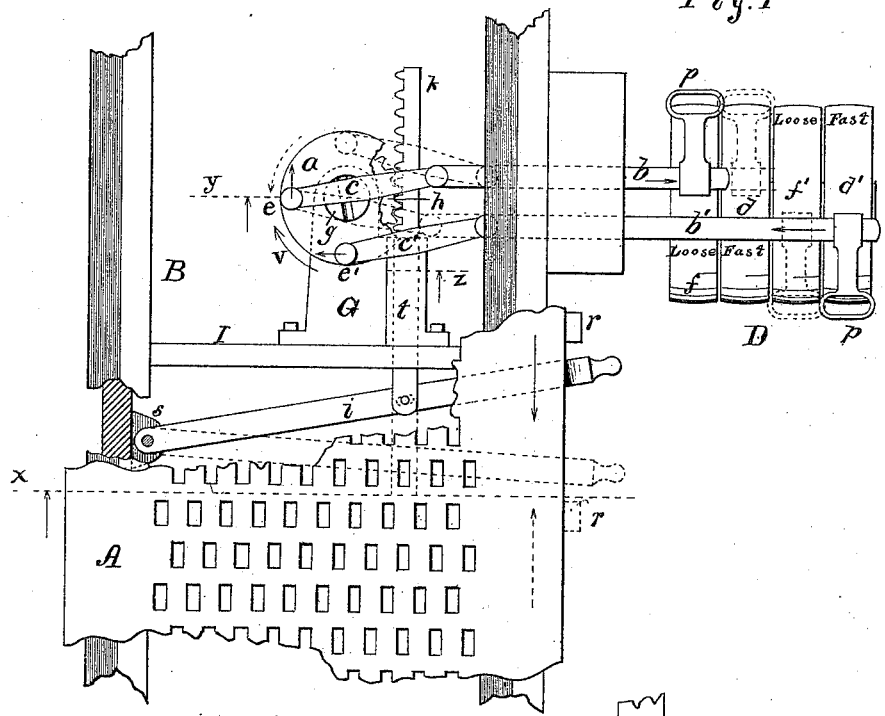
Attest:
E. E. Eddy.
J. E. Towner.
Inventor:
Wm. Gleason
By E. B. Whitmore, Atty.

United States Patent Office.

WILLIAM GLEASON, OF ROCHESTER, NEW YORK.

BELT-SHIFTER FOR IRON-PLANERS.

SPECIFICATION forming part of Letters Patent No. 301,054, dated June 24, 1884.

Application filed April 28, 1884. (No model.)

*To all whom it may concern:*

Be it known that I, WILLIAM GLEASON, of Rochester, in the county of Monroe and State of New York, have invented a new and useful Improvement in Belt-Shifters for Iron-Planers, which improvement is fully set forth in the following specification and accompanying drawings.

Metal-planers are commonly constructed with four belt-pulleys arranged side by side near the floor, at the side of the frame, having a common axis at right angles to the line of motion of the reciprocating bed. Two of these pulleys are loose on the shaft, acting only as idlers for the belts, and the other two fast, there being employed on these pulleys, to drive the bed of the planer, two belts, one of which belts is straight and the other crossed, to reverse the direction of motion of the pulleys turned by them. These belts have each to itself a tight pulley and an adjacent idler, and act alternately in driving the bed, one belt serving to drive the bed in one direction, and the other, for its contrary motion, in the opposite direction, and while either belt is operating, the other is thrown on its idler, to become, for the time being, inoperative. To change these belts each respectively from either pulley occupied by it to the adjacent pulley, shifters are employed which move laterally over the pulleys in directions parallel with their axis, which shifters crowd the belts edgewise from one pulley over onto another adjacent pulley across the narrow space between them. These shifters are usually moved simultaneously, or nearly so, and the result is that during the transition of the belts from one pulley to another, while they are each partly on a loose and partly on a tight pulley, there is a brief interval during which an antagonistic action between them takes place, each belt striving to turn its pulley against the efforts of the other. This leads at times to a rapid wearing of the belts, a disagreeable squeaking sound, and other objectionable results. To avoid these and other serious objections, by producing a shifting device or a driver for the shifters proper which shall so relatively time their motions that one belt shall be thrown substantially off its fast pulley before the other is thrown on the fast pulley of its pair, is the object of my invention.

Referring to the drawings, Figure 1 is a plan of a part of a metal-planer, showing my improved belt-shifting device attached in place, many parts being broken away and omitted, parts being sectioned, and other parts shown in two positions; and Fig. 2, an end sectional elevation of the same, the frame and the bed being sectioned on the dotted line $x$ in Fig. 1, the reciprocating disk, with its hub and attached pinion, sectioned on the dotted line $y$ in said figure, and the race for the rack sectioned on the dotted line $z$, parts of the planer being broken away and omitted.

Referring to the parts, A is the perforated bed or table, of common construction, resting in V's at the upper edge of the frame B, in the usual manner. C is a part of one of the ordinary posts secured to the side of the frame, and D the nest of pulleys, having a common axis at right angles to the line of the motion of the bed, upon which belts F F' drive the planer in the ordinary manner. Shifters $b$ $b'$, substantially of common form, for the belts F F', having loops $p$ $p$, through which the belts pass, are supplied, resting in bearings in the side of the frame, and extending in the usual manner out over the pulleys in lines parallel with the axial line of the pulleys.

$a$ is a disk or driver fitted to turn upon a vertical headed stud, $g$, forming a bearing therefor, said stud being screwed or secured firmly in a bracket, G, reaching out horizontally under the bed A from a cross-tie, I, of the frame B. The disk is provided with a hub, $l$, the lower end of which rests upon the bracket G for a bearing. A toothed rack, $k$, rests in a horizontal race, $t$, the latter being a raised part of the bracket G to accommodate the rack, the teeth of which rack engage the teeth of a pinion, $h$, secured rigidly to the hub $l$ of the disk. A lever, $i$, passes horizontally through a longitudinal slot, $n$, in the side of the frame, and is pivoted to a ledge, $s$, at the inside of the opposite web of the frame in position to be conveniently united in a flexible joint to the end of the rack k, as shown. The part of this lever at o outside of the frame is bent upward, to be encountered by the usual adjustable shifting-dogs, r, secured at the side of bed A, which dogs will alternately move the lever to one of the two positions shown by full and dotted lines. From this combination of parts it will be understood that as the bed A moves back and forth upon its slides the disk or driver a will be intermittently reciprocated upon its bearing g. The parts and motions of parts are so related that the disk is turned about one-fourth of a revolution each way.

As shown, the fast and loose pulleys D are alternated, there being a fast pulley between two loose pulleys and a loose pulley between two fast pulleys, and the shifters stand in position to cause the belts to move the bed or table A downward or toward the observer, as indicated by the full-line arrow. At the next shift, to reverse the motion of the bed, the shifters will occupy the positions shown in dotted lines, one having moved toward the frame of the planer and the other out from the frame, the directions of their motions being indicated by the arrows.

The shifters b b' extend through the web u of the frame, in which they rest, having their inner respective ends joined by connections c c' to pins e e', projecting upward from the disk or driver a. The connection c' of the shifter b', I attach to the driving-disk a at the point e', which point is in a line intersecting the axial line of the driver, and lying at right angles to the line of motion of said shifter, and the connection c of the shifter b, I attach to the driver at the point e, which is in a line at right angles to the line passing through the point e', just described, or in a line parallel to the line of motion of the shifter b. When by the advancing table A the lever i is moved to the position shown in dotted lines, drawing the rack k after it, the driver will be turned in the direction indicated by the arrow v. It will be observed that when the driver starts the initial motion at the point e' will be in a direction parallel to the line of motion of the shifter b' indicated by the arrow leading from said point, and that the initial motion at the point e will be in a direction at right angles to the direction of motion of the shifter b indicated by the arrow leading from said point e— that is to say, the connection of the shifter b' with the disk or driver is made at the point on the latter where the shifter will receive its maximum rate of motion from the driver when it starts to turn on its axis, as above stated, and the connection of the shifter b with the driver is at the point of said driver where the shifter will be moved the least rapidly, or receive its minimum rate of motion when the driver commences to turn; and by following the points e and e' as they move around it will appear that the shifter b' will start rapidly and progress with a retarded motion, while the shifter b will start with a slow motion and accelerate as it progresses and until the disk or driver ceases turning. The effect of these motions upon the belts will be that when the disk or driver commences to move, as stated, the belt F' will be hurried rapidly off the fast pulley d', while the belt F will be carried at first more leisurely on the fast pulley d, the quick motion of one shifter being simultaneous with the slow motion of the other. When the driver has been moved one-fourth of a revolution by the rack and comes to a stop, the connections c c' and shifters will respectively occupy the positions shown in dotted lines. The next movement of the shifting device will occur when the dog r (shown in dotted lines) encounters the lever i and throws said lever back to the position shown in full lines, causing the rack to reverse the motion of the driver or turn it in the direction indicated by the arrow in dots. From the dotted-line positions of the connections c and c' it will be understood that in this last movement of the driver the shifter b will be the one that will be caused to urge the belt F rapidly off its fast pulley d, and the belt F' will be moved at first slowly onto its fast pulley d'. These operations of the shifting device are all simple, and may be easily understood by inspecting Fig. 1 of the drawings. By urging the belts each in turn rapidly off its fast pulley, and the other belt more slowly onto its fast pulley, they operate with less opposition, and the planer-bed stops at each end of its run with less jarring, while much of the wear of the belts and the disagreeable noise is avoided. When the belts of the planer are thus shifted, or their lateral movements so relatively timed, the bed may be made to run back at comparatively a high rate of speed without jerking when it stops at the ends of its run, the backlash of the gear being modified and its action rendered easy and smooth.

I claim—

1. In an automatic belt-shifting device, the combination, with the fast and loose pulleys d and f, of the shifters b b' and automatic intermittent reciprocating disk a, to operate the shifters simultaneously, with connecting-rods c c', for the respective shifters and disk, said connecting-rods respectively being attached to the disk at the points e e', ninety degrees apart, where, when the disk commences to turn, the motions given the respective shifters will be in opposite directions, substantially as and for the purpose set forth.

2. The combination of the shifters b b' of a belt-shifting device, the driving-disk a, provided with pins e e', connections c c' for the respective shifters b b', and stud g for the disk, a pinion, h, secured to the disk, and rack k, to engage the pinion, with means, substantially as described, to give the rack intermittent reciprocating longitudinal motion, substantially as and for the purpose set forth.

3. In combination with the fast and loose pulleys of a belt-shifting device, the shifters $b\ b'$ and reciprocating driver $a$ for the shifters, with connections $c\ c'$ for the driver and shifters, said shifters being connected to the driver, so that when the latter commences to turn one shifter will start to move at a high rate and retard as it progresses, and the other shifter start to move at a low rate and accelerate as it progresses, substantially as set forth.

WILLIAM GLEASON.

Witnesses:
E. B. WHITMORE,
C. J. TOWNER.